(12) United States Patent
Barnes et al.

(10) Patent No.: US 6,849,972 B1
(45) Date of Patent: Feb. 1, 2005

(54) GENERATOR ROTOR FRETTING FATIGUE CRACK REPAIR

(75) Inventors: Gary R. Barnes, Delanson, NY (US); Sairam Sundaram, Albany, NY (US); Mandar K. Chati, Niskayuna, NY (US); Alexander G. Beckford, Scotia, NY (US); Ronald J. Zawoysky, Clifton Park, NY (US); Srikanth Akkaram, Troy, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/648,349

(22) Filed: Aug. 27, 2003

(51) Int. Cl.$^7$ .................................................. H02K 15/02
(52) U.S. Cl. ...................... 310/42; 310/261; 29/402.06; 29/598
(58) Field of Search .......................... 310/42, 214, 261, 310/273; 29/402.03–402.06, 402.08, 596, 598

(56) References Cited

U.S. PATENT DOCUMENTS

| | | | | |
|---|---|---|---|---|
| 4,363,982 A | * | 12/1982 | Kaminski | 310/61 |
| 5,027,500 A | | 7/1991 | Keck et al. | 29/598 |
| 5,174,011 A | | 12/1992 | Weigelt | 29/598 |
| 5,459,363 A | * | 10/1995 | Miyakawa et al. | 310/214 |
| 5,883,456 A | * | 3/1999 | Gardner et al. | 310/270 |
| 6,115,917 A | * | 9/2000 | Nolan et al. | 29/889.1 |
| 6,218,756 B1 | * | 4/2001 | Gardner et al. | 310/214 |

OTHER PUBLICATIONS

Weigelt, K. et al., "Recent Developments in Large Generator Repair Solutions and Monitoring Systems", Dec. 2, 1998, EPRI Generator Predictive Maintenance & Refurbishment Conference.*

Moore, W.G, "Mechanical Considerations for Uprate and Rehabilitation of Hydro–Generators", Electric Machines and Drives, International Conf. IEMD 1999, May 9–12, 1999, pp. 824–826.*

Klempner, G., "Ontario Hydro Experience with Generator Robot Forging Cracks at the Winding Slot Tooth Roots", Electric Machines & Drives, International Conf. IEMD 1999, May 9–12, 1999, pp. 299–304.*

Cross, C.S et al., "Refurbishment of Power Station Electrical Plant", International Conf. Nov. 7–8, 1988, pp. 155–159.*

EPRI "Generator Rotor Slot Dovetail Fretting Fatigue Cracks: Primer" Dec. 2003.*

"Fretting Fatigue Analysis of Strength Improvement Models with Grooving or Knurling on a Contact Surface," Hattori et al., *Standardization of Fretting Fatigue Test Methods and Equipment*, 1992, pp. 101–114.

"Effect of Contact Pressure on Fretting Fatigue of High Strength Steel and Titanium Alloy," Nakawaza et al., *Standardization of Fretting Fatigue Test Methods and Equipment*, 1992, pp. 115–125.

"Fretting Fatigue Evaluation Using Stress Singularity Parameters at Contact Edges," Hattori et al., *Fretting Fatigue*, 1994. Mechanical Engineering Publications London, pp. 453,460.

* cited by examiner

*Primary Examiner*—Burton Mullins
(74) *Attorney, Agent, or Firm*—Nixon & Vanderhye P.C.

(57) ABSTRACT

A method of repairing a crack in at least one side of a dovetail portion of a generator rotor coil slot wall, the dovetail portion having received at least two axially adjacent steel wedges and including at least a radial entry surface, an inwardly tapered surface and an intermediate radial surface, the method comprising a) machining a groove at least partly along the inwardly tapered surface to remove damaged material from the coil slot wall; and b) replacing the at least two axially adjacent steel wedges.

35 Claims, 6 Drawing Sheets

GENERATOR ROTOR FRETTING FATIGUE CRACK REPAIR

BACKGROUND OF THE INVENTION

This invention relates to generator rotors and specifically, to the repair of generator rotors that have experienced fretting damage and/or cracks in the rotor teeth located at the butt joints of the axially aligned rotor wedges.

Conventional dynamoelectric machines, such as generators used with gas and steam turbines, employ forged rotors of magnetic material into which radial slots are machined for receiving the conductive turns of field windings which are interconnected such as to produce a desired magnetic flux pattern. Typically, included in such conventional rotor slots are creepage blocks at both the top and bottom ends of the slot as well as coil slot wedges for resisting the radially outward forces exerted on the windings when the rotor is operational.

The slot wedges, which are generally dovetail shaped, are used to maintain the copper coils in place while the rotor is spinning at, for example, 3600 revolutions per minute. In the prior art such coil slot wedges were normally 6 to 12 inches long with a number of such wedges being required for each coil slot, particularly in the longer rotors with high electrical ratings. In an effort to decrease the number of parts that are required for assembly as well as increasing the overall speed of such assembly, full length wedges have been used in certain applications. For other applications, tolerances preclude the use of full length wedges and, in these cases, two or more wedges are used in each rotor slot. Cracks have been found, however, in the radial slot walls of several generators, at the butt joint between adjacent rotor wedges, apparently due to fretting damage found at the ends of steel wedges. If allowed to remain in the rotor, these cracks can grow and potentially cause a catastrophic failure of the rotor.

In the past, repairs to cracked generator rotor teeth have involved removing the damaged rotor tooth material. These repairs, however, have not done anything additional to eliminate the future occurrence of additional fretting fatigue damage.

It is also known to use aluminum rotor wedges in certain generator rotors, but these have not previously been recognized in the art as useful for the elimination of fretting fatigue.

One prior solution to the fretting fatigue problem was to machine away the damaged tooth material and to replace the multiple original short steel rotor pole wedges with a single, full-length aluminum wedge. As already mentioned above, however, there are many generator rotors that cannot make use of full length wedges and require the continued use of plural shorter wedges with original dimensions.

BRIEF DESCRIPTION OF THE INVENTION

This invention provides a process for repairing a generator rotor which has fretting fatigue damage in the rotor teeth at the butt joints of steel rotor wedges. The repair process eliminates existing cracks by machining away any damaged material to create a shape which minimally reduces the low and high cycle fatigue life of the rotor.

In one embodiment, the slot side wall is machined along a vertical entry surface and a tapered radially outward dovetail surface to remove the damaged material. The machined areas are concave in shape in a manner that only minimally reduces the low and high cycle fatigue life of the rotor.

In another embodiment, the machining process is continued into the intermediate vertical (or radial surface of the dovetail, and, in this area, extended axially in opposite directions such that the machined area takes on an inverted T-shape.

Future fretting damage is eliminated not only by removing the damaged material, but also by replacing the original steel wedges with similarly sized aluminum wedges. This solution is advantageous in that it does not require large scale machining or a high speed rotor balance operation, and is therefore suitable for implementation on site. When the wedges are replaced, the butt joint between adjacent wedges may be aligned with, or offset from the repaired area.

Accordingly, in one aspect, the present invention relates to a method of repairing a crack in at least one side of a dovetail portion of a generator rotor coil slot wall, the dovetail portion having received at least two axially adjacent steel wedges and including at least a radial entry surface, an inwardly tapered surface and an intermediate radial surface, the method comprising: a) machining a groove at least partly along the inwardly tapered surface to remove damaged material from the coil slot wall; and b) replacing the at least two axially adjacent steel wedges.

In another aspect, the invention relates to method of repairing a crack in at least one side of a dovetail portion of a generator rotor coil slot wall, the dovetail portion adapted to receive at least two axially adjacent steel wedges and including at least a radial entry surface, an inwardly tapered surface and an intermediate radial surface, the method comprising a) machining a first concave groove in the radial entry surface and only partly along the inwardly tapered surface to remove damaged material from the coil slot wall; and b) replacing the at least two axially adjacent steel wedges with aluminum wedges, such that the groove is centered on a butt joint between two axially adjacent replacement wedges.

In still another aspect, the invention relates to a method of repairing a crack in at least one side of a dovetail portion of a generator rotor coil slot wall, the dovetail portion adapted to receive at least two axially adjacent steel wedges and including at least a radial entry surface, an inwardly tapered surface and an intermediate radial surface, the method comprising a) machining a first groove in the radial entry surface and along the inwardly tapered surface; machining a second groove in the intermediate radial surface in an orientation transverse to the first groove; and b) replacing the two axially adjacent steel wedges with aluminum wedges, such that said groove is centered on a butt joint between two axially adjacent replacement wedges.

The invention will now be described in detail in connection with the drawings identified below.

DETAILED DESCRIPTION OF THE INVENTION

Figure 1:
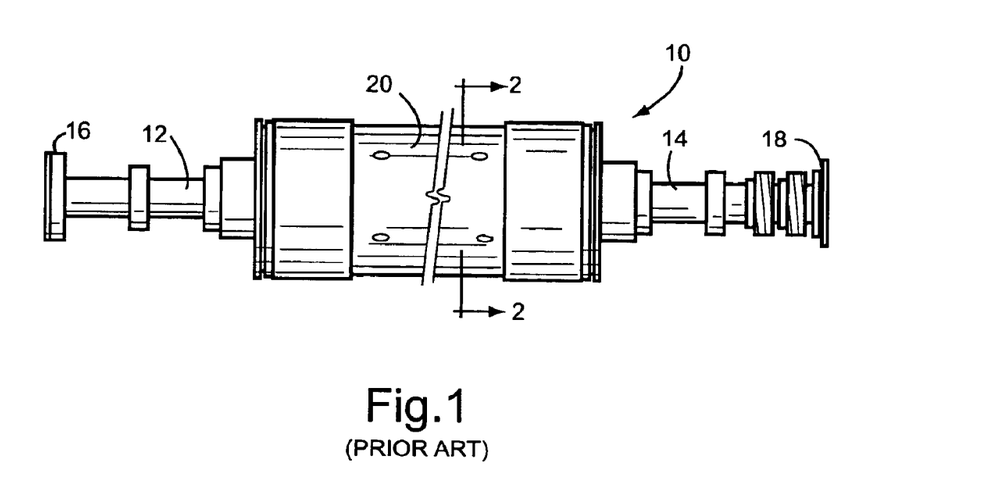
FIG. 1 is a side elevation of a conventional generator rotor including radially oriented coil slots.
Figure 2:
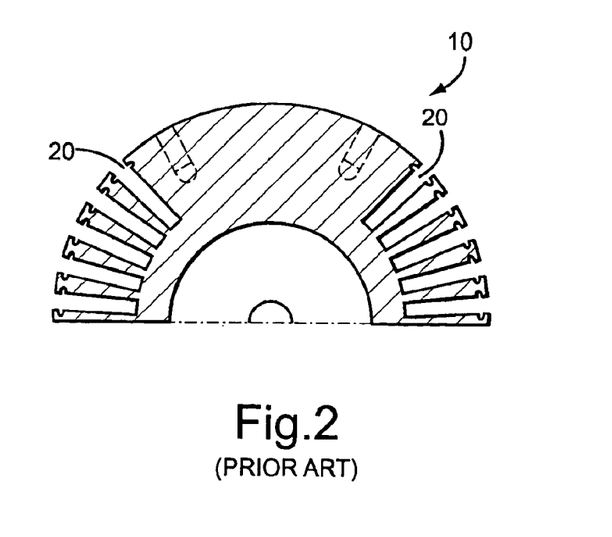
FIG. 2 is a partial cross section of the rotor body taken along the lines 2—2 of FIG. 1.

FIGS. 1 and 2 illustrate a typical rotor 10 for a dynamoelectric machine wherein the rotor includes conventional elements such as rotor end shaft portions 12, 14 and couplings 16, 18 for connection with a turbine or gear reduction unit. Of particular significance here are the axially oriented coil slots 20 arranged circumferentially about the midsection of the rotor, that are used for holding the copper field windings or coils.

Figure 3:
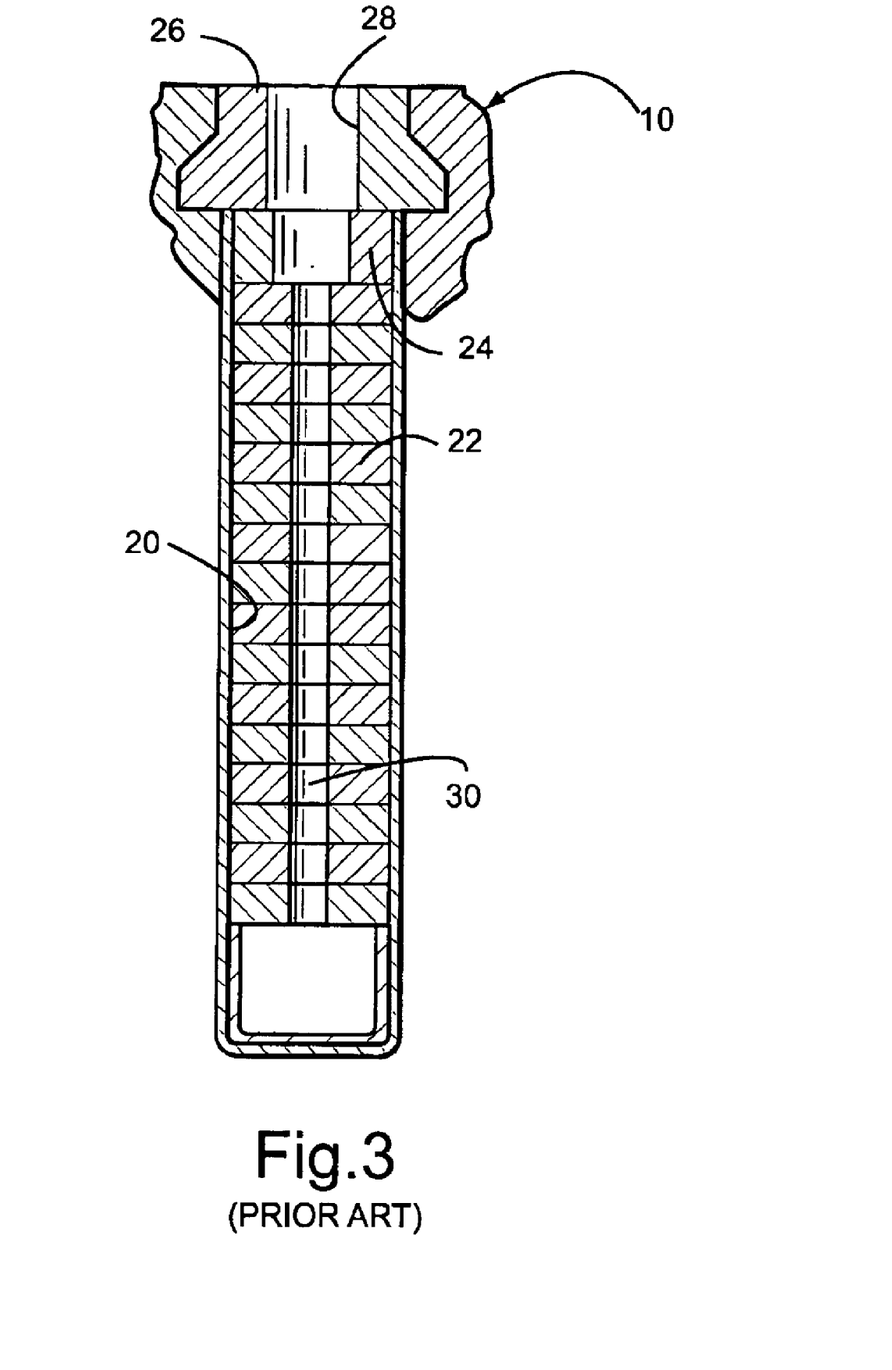
FIG. 3 is a cross section through a typical coil slot and contents thereof.

With further reference to FIG. 3, the coil slots 20 are each radially directed and typically contain, in a radially outward sequence, insulated copper coils 22, a creepage block 24, and a plurality of axially aligned slot wedges 26. The wedges have a generally dovetail shape in cross section, and are located and arranged so as to maintain the copper coils 22 and creepage block 24 in place while the rotor is spinning. The slot wedges 26 may also contain ventilation holes 28 (one shown) which are in general alignment with ventilation channels 30 (one shown) which pass through the copper conductors or coils, as well as through the creepage block 24.

Figure 7:
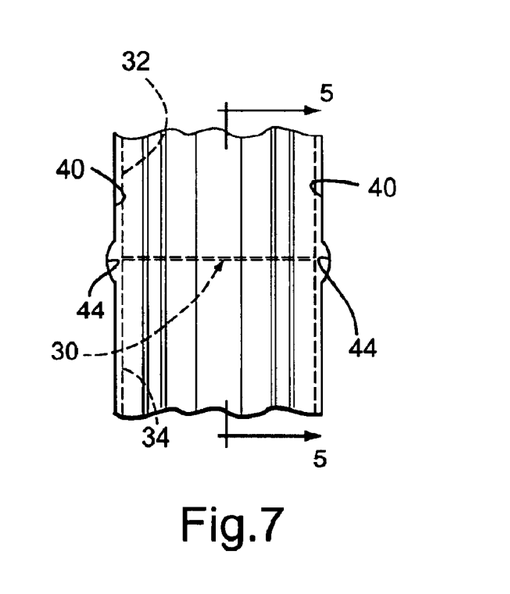
FIG. 7 is a plan view of the rotor slot shown in FIG. 6, with adjacent wedges shown in phantom.

Fretting fatigue damage has occurred in the coil slots 20, specifically in the slot walls, at the butt joints of the axially adjacent steel rotor wedges 26 (a butt joint 30 between a pair of adjacent wedges 32, 34 is shown in phantom in FIG. 7). Fretting occurs whenever a junction between components is subjected to a cyclic load that leads to small tangential displacement over part of the interface. A two dimensional (radial-axial) finite element fretting model was developed to model the mechanics of contact between the rotor slot 20, and particularly the dovetail-shaped portion 36 of the slot wall 38 (see FIGS. 4 and 5) and the wedge 26, where fretting initiated cracks were observed in the rotor. The model provided a qualitative understanding of the fretting mechanism and provided a basis for preliminary assessment of various wedge redesign options.

The objective of the analysis was to understand the fretting behavior in terms of the fretting damage parameter (FDP) as the machine is being ramped up to Full Speed (FS) at $\omega$=3600 rpm. In order to investigate the fretting behavior as the machine undergoes start-up or shut-down, a similar analysis was performed at $\omega$=569 and 805 rpm.

The effect of the wedge material was also considered in the analysis. Steel (E=206.85 GPa) as well as aluminum wedges (E=70.329 GPa) are currently being used. The rotor material was a high strength steel, and a friction coefficient of $\mu$=0.47 was used for steel-aluminum contact. Large differences were observed in the stick-slip behavior for aluminum and steel wedges at 360 rpm and 569 rpm. Steel wedges have a larger sliding region and higher magnitudes of slip when compared to aluminum wedges. Steel wedges also show a significantly higher fretting damage at the same rotor speed.

The highlights of the findings of the analyses are summarized:

(1) Fretting damage tendency is highest at locations near the wedge ends rather than the center of the wedge. This correlates with the field experience that fretting cracks and damaged material have been observed at the butt joints between wedges.

(2) Fretting damage tendency is much higher for steel wedges than aluminum wedges. This correlates with the field experience that fretting cracks have been observed only in coil slots next to the pole where steel wedges are used. All other coil slots (that nominally see the same mechanical loading as the coil slots next to the pole) use aluminum wedges where no fretting cracks have been observed.

(3) Fretting damage accumulation occurs during start-up and shutdown as opposed to Full Speed Operation. This correlates with the field observation that fretting cracks have been observed in machines with large number of start/stops or peaking units (e.g. 2 units that demonstrated Fretting Damage had 900 start, 1600 starts).

Figures 4, 5:
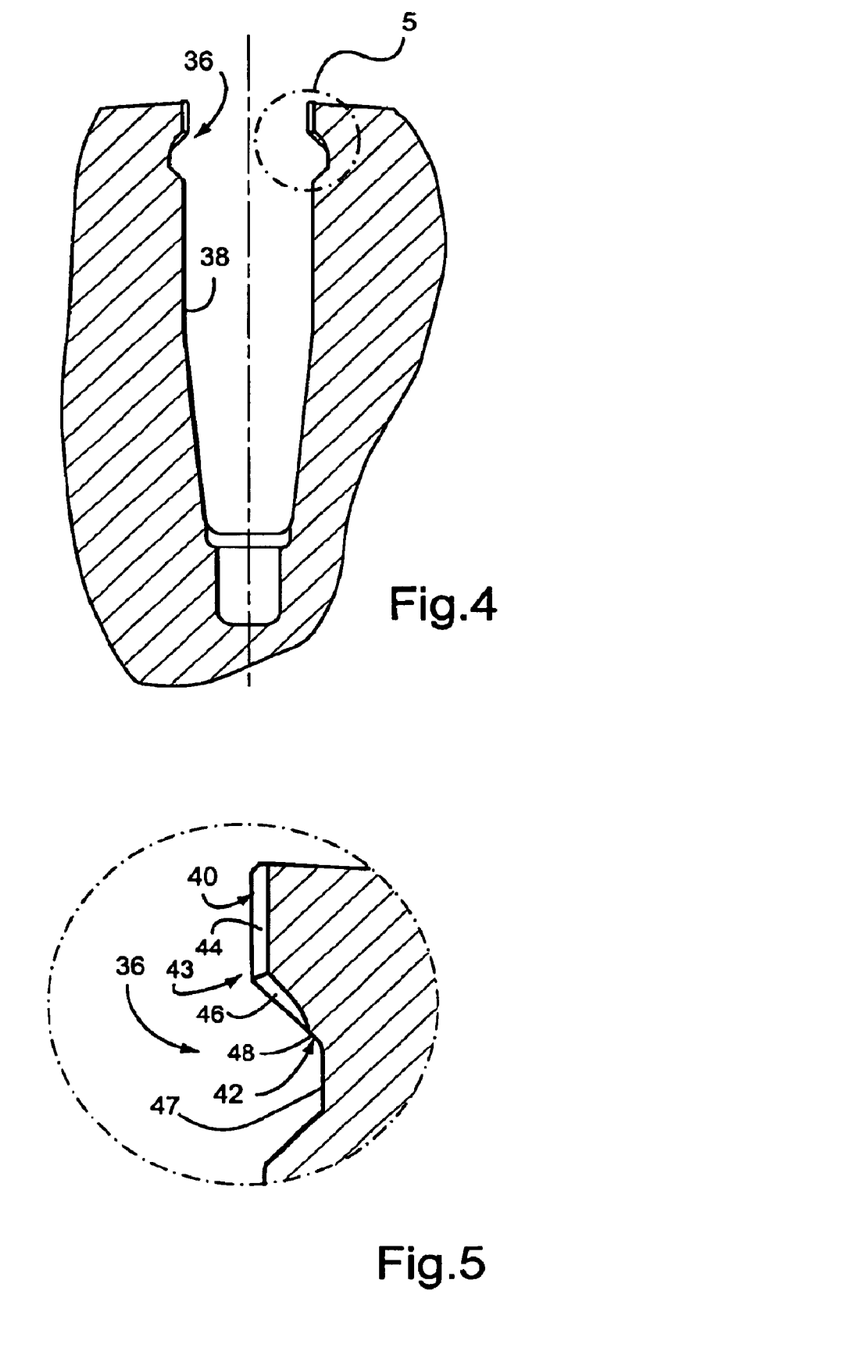
FIG. 4 is a cross section of a rotor slot with damaged areas machined away in accordance with a first exemplary embodiment of the invention.
FIG. 5 is an enlarged detail taken from FIG. 4.
Figure 6:
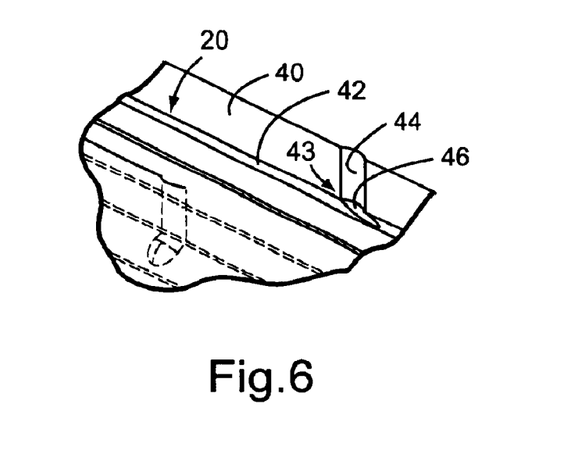
FIG. 6 is a partial perspective view of the rotor slot, showing damaged areas machined away from opposite sides of the slot wall.
Figure 8:
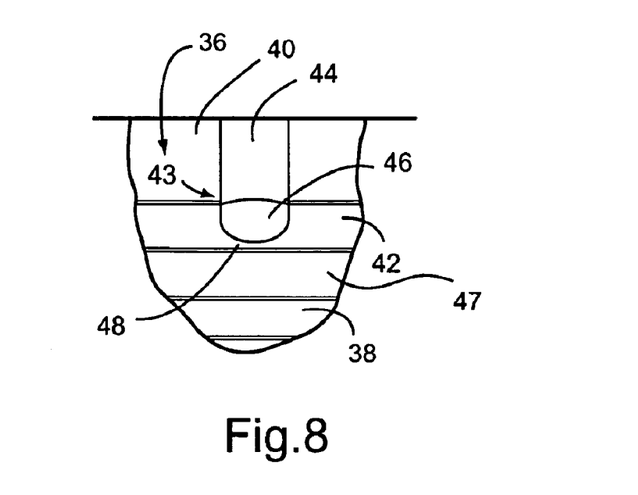
FIG. 8 is a side elevation of one of the rotor slot side walls shown in FIGS. 5 and 6.

The present invention has two significant aspects in terms of repair of fretting cracks in rotor teeth. First, the damaged material is ground out of the rotor and a local stress field is altered near the repaired ends. With reference to FIGS. 4 and 5, the machined area is in the wedge-receiving dovetail portion 36 of the slot wall 38. As already noted, this is the area of the slot wall that is susceptible to fretting cracks, and particularly, at the interface of two abutting steel wedges. Initially, a suitably shaped and sized machining bit (e.g., a 0.625 dia. bit) is used to machine the vertical slot entry surface 40 and thereafter, most of the radially outer tapered dovetail surface 42, best seen in FIGS. 5 and 8. The machining work creates a first concave groove 43, including groove portions 44 and 46. Note that a small area 48 (FIG. 8) of the tapered surface 42 remains in its original state, and, as such, the groove portion 46 does not extend into the radial intermediate surface 47. Once the material is machined to form groove portions 44 and 46, the sharp edges along the boundaries of both portions are radiused. Machining in this manner only minimally reduces the low and high cycle fatigue life of the rotor. Where appropriate (i.e., depending on the crack location and extent of the crack), the repair may be effected by forming the first groove portion 46 only. When the wedges are replaced, the butt joint between adjacent wedges 32, 34 may be centered on the machined regions (i.e., on the radial centerline through the groove 43, as shown in FIG. 7. Alternatively, the wedge butt joint may be axially offset from the repaired area.

Once the machine repair is completed, the steel wedges 32, 34 are replaced, preferably with aluminum wedges of the same size, located in the same positions relative to the repaired areas. This has been shown to minimize the potential for future fretting damage in the rotor. However, the replacement wedges may be steel, particularly if, for example, aluminum wedges are not available.

Figure 9:
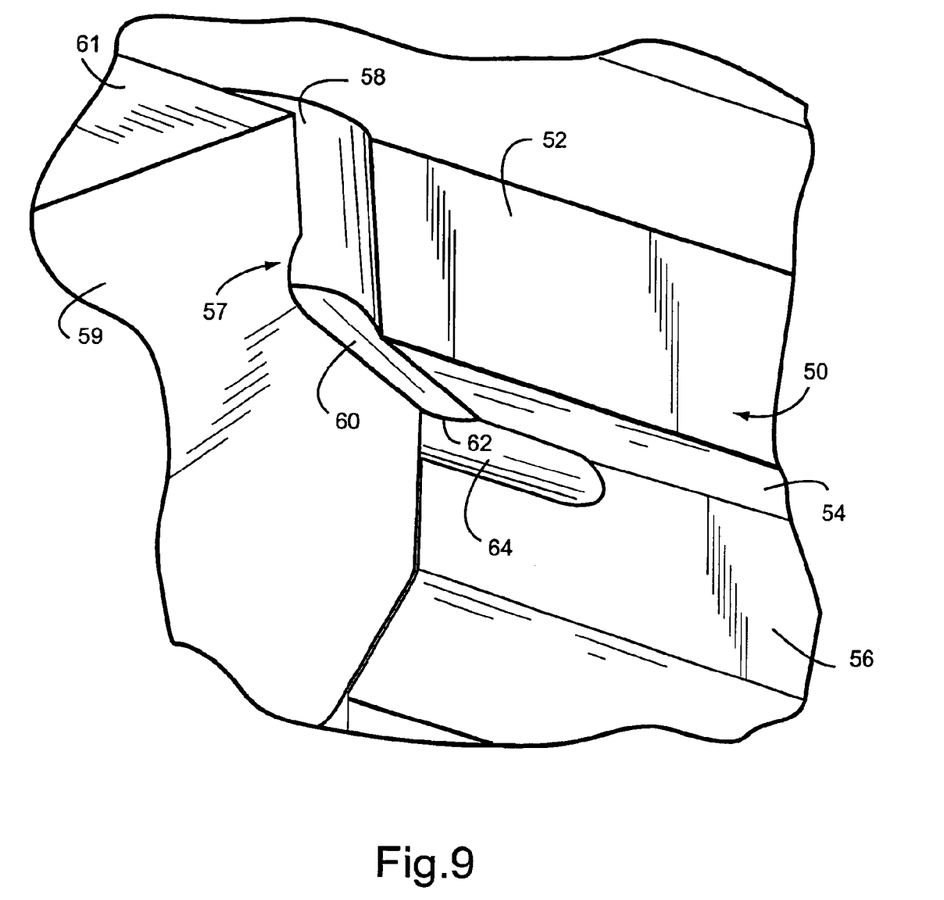
FIG. 9 is a partial perspective of a radial coil slot and wedge, showing damaged material machined away in accordance with a second exemplary embodiment of the invention.
Figure 10:
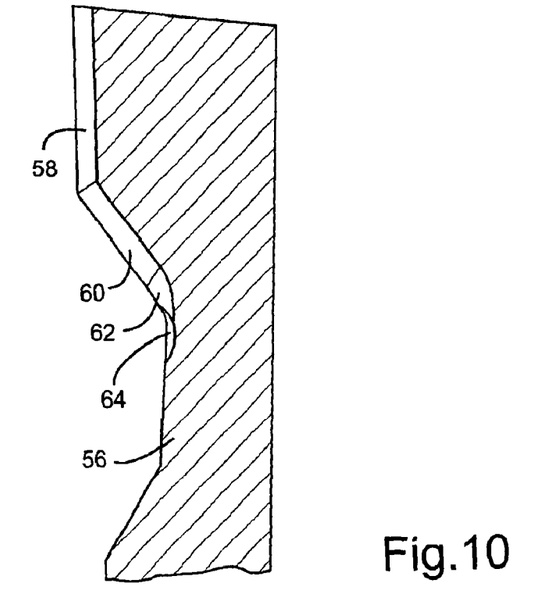
FIG. 10 is a partial cross section of the radial coil slot shown in FIG. 9.
Figure 11:
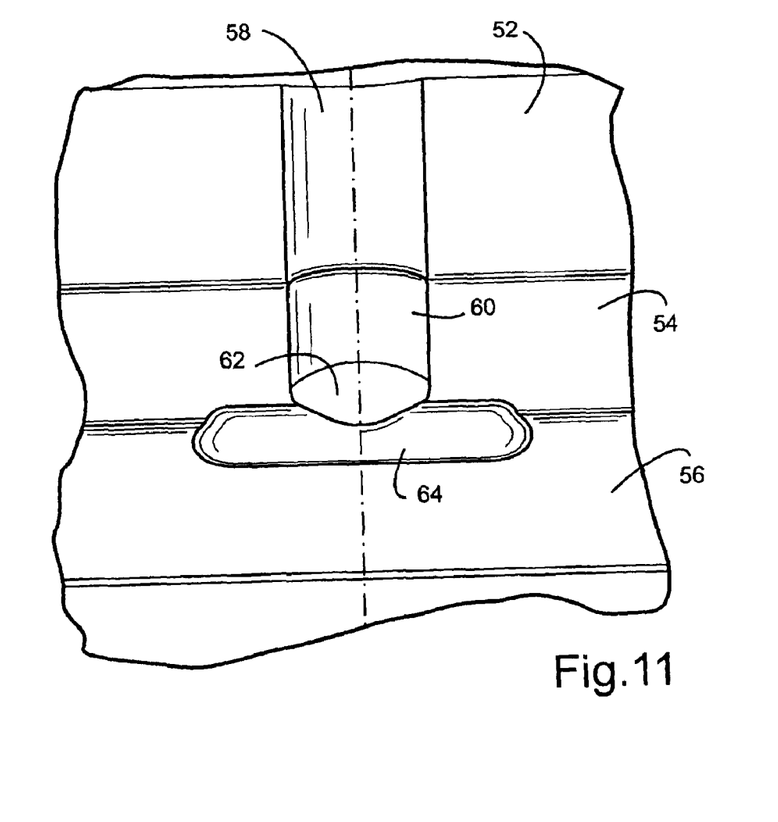
FIG. 11 is a partial side elevation of the coil slot shown in FIG. 10.

FIGS. 9–11 illustrate a variation in the above described repair procedure. Here, the coil slot wall 50 is machined on the vertical (or radial) entry surface 52, the upper or radially outer tapered surface 54 of the dovetail configuration, and into the vertical or radial intermediate surface 56 of the dovetail. Specifically, the tool is utilized to machine a narrow, concave groove 57 including groove portion 58 in the radial surface 52, and radially aligned groove portion 60 in the tapered surface 54, overlapping into the transition zone between surfaces 54, 56 at 62. A second tool (e.g., a 1.25 in dia. disk) is then used to machine a second groove 64 transverse to the groove 57, i.e., in the axial direction of the slot. Thus, the machined grooves take the shape of an inverted "T," with first groove 57, including groove portions 58, 60 serving as the stem and second groove 64 serving as the cross member of the "T". It is also noted that the centerline through grooves 57, 60 may, again, be aligned with the joint between the wedges, or axially offset therefrom. Note end surface 59 of the wedge 61 in FIG. 9. Further in this regard, in the exemplary embodiment, the groove portions 58, 60 of the first groove 57 have equal widths of about 0.37 inch while second groove 64 has a width less than half that, i.e., 0.12 inch. From either side edge of groove portion 60, the second groove 64 projects about 0.25 inch. Here again, after machining, all surface edges defining the grooves 57 and 64 are radiused to reduce stress. As in the first described embodiment, the groove portion 58 in the radial surface 52 may be eliminated where appropriate.

It should also be noted that the drawings illustrate repaired areas on opposite sides of the slot. If a crack appears on only one side of the slot, the repair procedure may be confined to that side. However, the opposite side may also be machined as a preventative measure.

While the invention has been described in connection with what is presently considered to be the most practical and preferred embodiment, it is to be understood that the invention is not to be limited to the disclosed embodiment, but on the contrary, is intended to cover, various modifications and equivalent arrangements included within the spirit and scope of the appended claims.

What is claimed is:

1. A method of repairing a crack in at least one side of a dovetail portion of a generator rotor coil slot wall, the dovetail portion adapted to receive at least two axially adjacent steel wedges and including at least a radial entry surface, an inwardly tapered surface and an intermediate radial surface, the method comprising:

a) machining a first concave groove in said radial entry surface and only partly along said inwardly tapered surface to remove damaged material from said coil slot wall.

2. The method of claim 1 and including replacement of said two axially adjacent steel wedges.

3. The method of claim 2 wherein said steel wedges are replaced with aluminum wedges.

4. The method of claim 3 wherein said steel wedges are replaced with wedges of the same material.

5. A method of repairing a crack in at least one side of a dovetail portion of a generator rotor coil slot wall, the dovetail portion having received at least two axially adjacent steel wedges and including at least a radial entry surface, an inwardly tapered surface and an intermediate radial surface, the method comprising:

a) machining a groove at least partly along said inwardly tapered surface and radially along said radial entry surface to remove damaged material from said coil slot wall; and b) replacing said at least two axially adjacent steel wedges.

6. The method of claim 5 wherein step b) includes replacing the steel wedges with aluminum wedges.

7. The method of claim 5 wherein said groove is concave.

8. The method of claim 5 wherein said groove stops short of a radially inner edge of said inwardly tapered surface.

9. The method of claim 5 wherein said groove has a depth of about 0.06 inch.

10. The method of claim 5 wherein said groove is about 0.37 inch wide.

11. The method of claim 5 wherein edges of said groove are radiused.

12. The method of claim 5 wherein steps a), b) and c) are carried out on an opposite side of said coil slot wall as a preventative measure.

13. A generator rotor repaired according to the method of claim 5.

14. The method of claim 5 wherein step b) includes replacing the steel wedges with wedges of the same material.

15. A method of repairing a crack in at least one side of a dovetail portion of a generator rotor coil slot wall, the dovetail portion having received at least two axially adjacent steel wedges and including at least a radial entry surface, an inwardly tapered surface and an intermediate radial surface, the method comprising:

a) machining a groove at least partly along said inwardly tapered surface to remove damaged material from said coil slot wall; wherein said groove extends to a radially inner edge of said inwardly tapered surface;

b) machining a second groove in said intermediate radial surface in an orientation transverse to said first groove; and c) replacing said at least two axially adjacent steel wedges.

16. The method of claim 15 wherein step a) includes extending said groove radially along said radial entry surface.

17. The method of claim 16 wherein said second groove extends about 0.25 inch on either side of said groove.

18. The method of claim 16 wherein said groove is about 0.37 inch wide.

19. The method of claim 18 wherein said groove has a depth of about 0.06 inch.

20. The method of claim 15 wherein edges of said groove and said second groove are radiused.

21. The method of claim 15 wherein step b) includes replacing the steel wedges with wedges of the same material.

22. The method of claim 15 wherein step b) includes replacing the steel wedges with aluminum wedges.

23. A method of repairing a crack in at least one side of a dovetail portion of a generator rotor coil slot wall, the dovetail portion adapted to receive at least two axially adjacent steel wedges and including at least a radial entry surface, an inwardly tapered surface and an intermediate radial surface, the method comprising:

a) machining a first concave groove in said radial entry surface and only partly along said inwardly tapered surface to remove damaged material from said coil slot wall; and b) replacing said at least two axially adjacent steel wedges with aluminum wedges, such that said groove is centered on a butt joint between two axially adjacent replacement wedges.

24. The method of claim 23 wherein said groove has a depth of about 0.06 inch and a width of about 0.37 inch.

25. The method of claim 23 wherein edges of said first groove are radiused.

26. The method of claim 23 wherein steps a) and b) are carried out on an opposite side of said coil slot wall as a preventative measure.

27. A generator rotor repaired according to the method of claim 23.

28. A method of repairing a crack in at least one side of a dovetail portion of a generator rotor coil slot wall, the dovetail portion adapted to receive at least two axially adjacent steel wedges and including at least a radial entry surface, an inwardly tapered surface and an intermediate radial surface, the method comprising:

a) machining a first groove in said radial entry surface and along said inwardly tapered surface;

b) machining a second groove in said intermediate radial surface in an orientation transverse to said first groove; and c) replacing said two axially adjacent steel wedges with aluminum wedges, such that said groove is centered on a butt joint between two axially adjacent replacement wedges.

29. The method of claim 28 wherein said first and second grooves are concave in cross section.

30. The method of claim 28 wherein edges of said first and second grooves are radiused.

31. The method of claim 28 wherein said first groove has a depth of about 0.06 inch.

32. The method of claim 28 wherein said first groove is about 0.37 inch wide.

33. The method of claim 28 wherein said second groove extends about 0.25 inch on either side of said first groove.

34. The method of claim 28 wherein steps a) and b) are carried out on an opposite side of said coil slot wall as a preventative measure.

35. A generator rotor repaired according to the method of claim 28.

* * * * *